(12) United States Patent
Marinov

(10) Patent No.: US 11,413,692 B2
(45) Date of Patent: Aug. 16, 2022

(54) SAW DRIVETRAIN WITH A CHAIN DRIVE AND GEAR TRAIN

(71) Applicant: Robert Bosch GmbH, Stuttgart (DE)

(72) Inventor: Plamen V. Marinov, Mount Prospect, IL (US)

(73) Assignees: Robert Bosch Power Tools GmbH, Leinfelden-Echterdingen (DE); Robert Bosch GmbH, Stuttgart (DE)

( * ) Notice: Subject to any disclaimer, the term of this patent is extended or adjusted under 35 U.S.C. 154(b) by 122 days.

(21) Appl. No.: 16/583,323

(22) Filed: Sep. 26, 2019

(65) Prior Publication Data

US 2021/0094109 A1 Apr. 1, 2021

(51) Int. Cl.
*B23D 47/12* (2006.01)
*B23D 45/04* (2006.01)

(52) U.S. Cl.
CPC ......... *B23D 47/126* (2013.01); *B23D 45/044* (2013.01)

(58) Field of Classification Search
CPC ............................ B23D 47/126; B23D 45/044
See application file for complete search history.

(56) References Cited

U.S. PATENT DOCUMENTS

| | | | | |
|---|---|---|---|---|
| 4,660,448 A * | 4/1987 | Bies | .............. | B23Q 11/0078 83/13 |
| 5,425,294 A * | 6/1995 | Ushiwata | ............. | B23D 45/044 83/468.3 |
| 7,252,027 B2 * | 8/2007 | Meredith | ............. | B23D 45/044 83/468.3 |
| 8,272,454 B2 | 9/2012 | Kani et al. | | |
| 8,302,519 B2 | 11/2012 | McCracken et al. | | |
| 9,555,490 B2 | 1/2017 | Cox | | |
| 10,369,640 B2 | 8/2019 | Marinov | | |
| 2005/0056128 A1 * | 3/2005 | Chang | .................. | B23D 45/044 83/100 |
| 2009/0151529 A1 * | 6/2009 | Miura | .................. | B23D 47/126 83/471.3 |

(Continued)

FOREIGN PATENT DOCUMENTS

CN 202498262 U 10/2012
EP 1 231 007 A2 8/2002

(Continued)

*Primary Examiner* — Evan H MacFarlane
*Assistant Examiner* — Liang Dong
(74) *Attorney, Agent, or Firm* — Maginot, Moore & Beck LLP

(57) ABSTRACT

A saw device includes a motor having a motor output shaft and a drivetrain that includes a gear train and a chain drive. The gear train has a first gear fixedly connected to the motor output shaft and a second gear fixedly connected to an intermediate shaft, the first gear meshing with the second gear so as to transmit rotation from the motor output shaft to the second gear. The chain drive has a driving sprocket fixedly connected to the intermediate shaft, a driven sprocket, and a chain configured to transmit rotation of the driving sprocket to rotation of the driven sprocket. The saw device further includes an arbor shaft fixedly connected to the driven sprocket, the arbor shaft configured to mount a saw blade such that the saw blade rotates with the arbor shaft, and an upper guard configured to enclose at least a portion of the saw blade.

13 Claims, 5 Drawing Sheets

(56) References Cited

U.S. PATENT DOCUMENTS

| | | | | |
|---|---|---|---|---|
| 2009/0260498 A1* | 10/2009 | Imamura | ............ | B23D 45/048 |
| | | | | 83/663 |
| 2013/0055873 A1* | 3/2013 | Cox | ............ | B23D 47/12 |
| | | | | 83/471.2 |
| 2015/0059548 A1 | 3/2015 | Kani | | |

FOREIGN PATENT DOCUMENTS

| | | |
|---|---|---|
| EP | 1 604 764 A1 | 12/2005 |
| EP | 2 100 684 A2 | 9/2009 |
| KR | 10-2009-0015165 A | 2/2009 |
| WO | 2014/150859 A1 | 9/2014 |

\* cited by examiner

SAW DRIVETRAIN WITH A CHAIN DRIVE AND GEAR TRAIN

TECHNICAL FIELD

This disclosure relates generally to the field of powered saws, and more particularly to drivetrains for powered saws.

BACKGROUND

Powered saws can be used to make a variety cuts in a wide variety of workpieces. Miter saws use a rotating saw blade to make crosscuts in a workpiece. Miter saws in particular are adjustable, and when properly set up by a user, enable accurate crosscuts, miter cuts, and bevel cuts of workpieces.

Miter saws are used for cutting many different types of material, including lumber of different types as well as synthetic materials. The typical miter saw includes a base or a platform on which a turntable is positioned. The turntable includes a workpiece support surface to support a workpiece to be cut by the miter saw. A support assembly is coupled to the turntable and functions to support a cutting assembly that is operable to perform a cutting operation on the work piece. The support assembly includes adjustable components which enable the cutting assembly to move away from or toward the support surface in order to cut the workpiece. The support assembly also typically includes other adjustable components configured to pivot the cutting assembly about an angle inclined with respect to the support surface in order to produce beveled or angled cuts on the work piece. The typical miter saw further includes a motor and a drivetrain, which transmits rotation from the motor to the saw blade for a cutting operation.

Tall workpieces, such as base boards and crown moldings, can typically only be cut at zero and left bevel angles with conventional miter saws. Right bevel angle settings are not possible because the saw motor and drivetrain is typically positioned on the right side of the miter saw. The motor and drivetrain extend away from the saw blade and interfere with the ability of the saw to be adjusted through some angles to the right side of the saw.

In some conventional miter saws, the motor is moved to a position above the profile of the upper blade guard, thereby allowing for the motor to cross the plane of the saw blade and enabling larger right-miter bevel angles. However, positioning the drivetrain remotely from the central axis of the arbor shaft requires a drivetrain with a large number of gears to transmit the power from the motor to the blade. Such drivetrains are bulky, heavy, and expensive. Alternatively, some conventional saws transmit the power from a remote motor with a belt arrangement. The belt, however, can cause power losses due to friction, reducing the torque available at the saw blade.

Additionally, positioning the motor at a position above the profile of the upper blade guard also requires that at least a portion of the drivetrain extends above the extent of the upper blade guard. The conventional saw therefore has increased vertical size, which can interfere with the upward picoting of the saw, increase difficulty of moving the saw, and potentially interfere with a user's ability to see and manipulate the workpiece while cutting.

Therefore there is a need for a saw which is configured to provide left and right bevel cuts and zero bevel cuts with reduced interference from the motor and which provides low friction losses. Additionally, there is a need for a miter saw with a compact motor and drivetrain arrangement.

SUMMARY

A saw device comprises a motor having a motor output shaft, and a drivetrain comprising a gear train and a chain drive. The gear train includes a first gear fixedly connected to the motor output shaft and a second gear fixedly connected to an intermediate shaft, the first gear meshing with the second gear so as to transmit rotation from the motor output shaft to the second gear. The chain drive has a driving sprocket fixedly connected to the intermediate shaft, a driven sprocket, and a chain configured to transmit rotation of the driving sprocket to rotation of the driven sprocket. The saw device further includes an arbor shaft fixedly connected to the driven sprocket, the arbor shaft configured to mount a saw blade such that the saw blade rotates with the arbor shaft, and an upper guard configured to enclose at least a portion of the saw blade.

In some embodiments, the drivetrain of the saw device is located entirely below a horizontal plane defined by an uppermost point of the upper guard in a vertical plane that bisects the arbor shaft.

In further embodiments, the motor output shaft and the intermediate shaft are arranged in a vertical plane that bisects the arbor shaft along a central axis of the arbor shaft.

In another embodiment of the saw device, the motor output shaft extends at an angle of between zero and 90 degrees relative to the intermediate shaft and the arbor shaft.

In yet another embodiment, the saw device further comprises a motor housing in which the motor is housed, the motor housing being located entirely below the horizontal plane.

In one embodiment, the motor output shaft extends at an angle of approximately 45 degrees relative to the intermediate shaft and the arbor shaft.

In some embodiments of the saw device, the motor output shaft is perpendicular to the arbor shaft and the intermediate shaft.

The saw device may, in additional embodiments, further comprise a drivetrain housing in which the drivetrain is enclosed, the drivetrain housing being almost entirely arranged below the horizontal plane.

In another embodiment, the drivetrain housing of the saw device has a lower portion with a rear end surface that extends vertically adjacent to the chain.

In yet another embodiment, the drivetrain is located entirely within a volume bounded by a horizontal extension of the saw blade.

The gear train of the saw device may, in some embodiments have a gear reduction of between 1:2 and 1:6.

In another embodiment according to the disclosure, a miter saw comprises a base assembly defining a workpiece support surface, a motor having a motor output shaft, and a drivetrain comprising a gear train and a chain drive. The gear train has a first gear fixedly connected to the motor output shaft and a second gear fixedly connected to an intermediate shaft, the first gear meshing with the second gear so as to transmit rotation from the motor output shaft to the second gear. The chain drive includes a driving sprocket fixedly connected to the intermediate shaft, a driven sprocket, and a chain configured to transmit rotation of the driving sprocket to rotation of the driven sprocket. The miter saw further includes an arbor shaft fixedly connected to the driven sprocket, the arbor shaft configured to mount a saw blade such that the saw blade rotates with the arbor shaft, and an upper guard configured to enclose at least a portion of the saw blade. The drivetrain of the saw device is located entirely below a horizontal plane that is parallel to the workpiece support surface and is defined by an uppermost point of the upper guard in a vertical plane that bisects the arbor shaft.

DETAILED DESCRIPTION

For the purposes of promoting an understanding of the principles of the embodiments described herein, reference is now made to the drawings and descriptions in the following written specification. No limitation to the scope of the subject matter is intended by the references. This disclosure also includes any alterations and modifications to the illustrated embodiments and includes further applications of the principles of the described embodiments as would normally occur to one skilled in the art to which this document pertains.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

The terms "comprising," "including," "having," and the like, as used with respect to embodiments of the disclosure, are synonymous. As used herein, the term "approximately" is to be interpreted to encompass the range that one of ordinary skill in the art would consider reasonable in the context of the particular use of the term. Alternatively, the term "approximately" may be interpreted to include all values that are within ±10% of the reference value.

Figure 1:
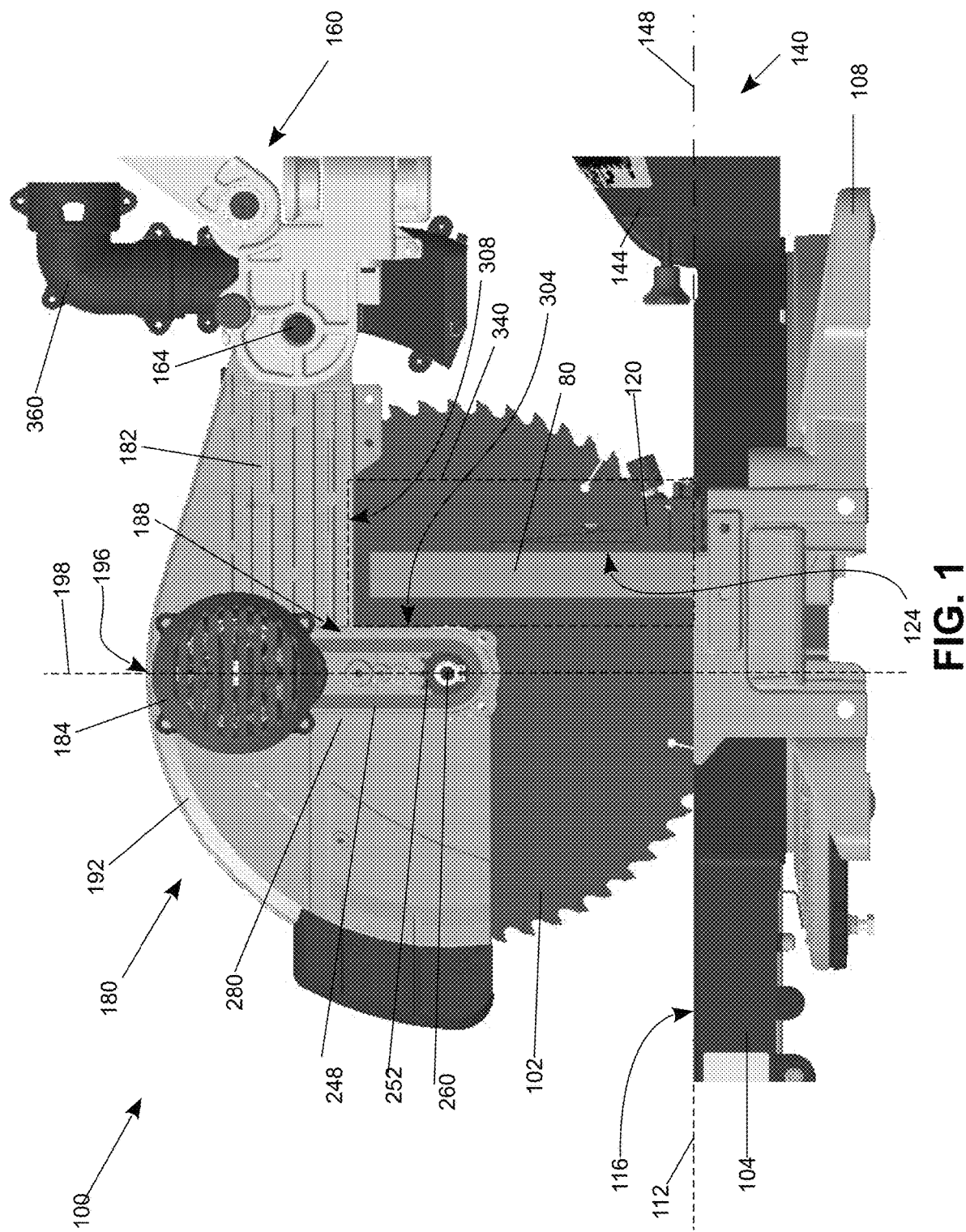
FIG. 1 is a schematic side elevational view of a miter saw device having a chain and gear drivetrain.

FIG. 1 is a schematic elevational side view of saw device 100, which, in the illustrated embodiment, is a miter saw configured to cut a workpiece 80 with a circular saw blade 102. The reader should appreciate, however, that in other embodiments the saw device 100 may be another type of saw device, for example a bevel saw, a compound saw, a table saw, a planer, a mini saw, a handheld saw, or another device with a saw blade or other type of blade that is capable of penetrating into a workpiece.

The saw device 100 is specifically configured and adapted to receive a saw blade 102 of a particular size and rotate the saw blade 102 to cut a workpiece 80. Miter saws are commonly referred to or characterized by the saw blade size for which they are configured to use. Common saw blade sizes for which miter saws are configured are 12 inches, 10 inches, 8.5 inches, and 7.5 inches though the reader should appreciate that saw devices may be configured for other desired saw blade sizes. As used herein, the phrase "saw blade diameter" is a property of the saw device that refers to the maximum diameter saw blade that the saw device is configured to use.

The saw device 100 includes a turntable 104 supported by a base 108, which is configured to rest on a flat surface of a workbench, table, or other supporting structure. The turntable 104 is rotatably adjustable on the base 108 about a pivot axis that extends generally perpendicular to a horizontal plane 112 defined by a support surface 116 of the turntable 104. As used herein, the terms "horizontal" and "vertical" refer to a fixed frame of reference in which the workpiece support surface 116 defines the horizontal direction and the saw device is in the non-pivoted position depicted in FIG. 1. The support surface 116 is configured to vertically support the workpiece 80 that rests on the support surface 116.

The saw device 100 further includes a guide fence 120, which has a workpiece guide surface 124 against which the workpiece 80 rests and that supports the workpiece 80 against rearward movement during cutting operations. The guide fence 120, as illustrated, may be adjustable to align generally perpendicularly with the support surface 116. In other embodiments, the guide fence 120 may be adjustable such that the workpiece guide surface 124 is inclined with respect to the support surface 116.

Figure 2:
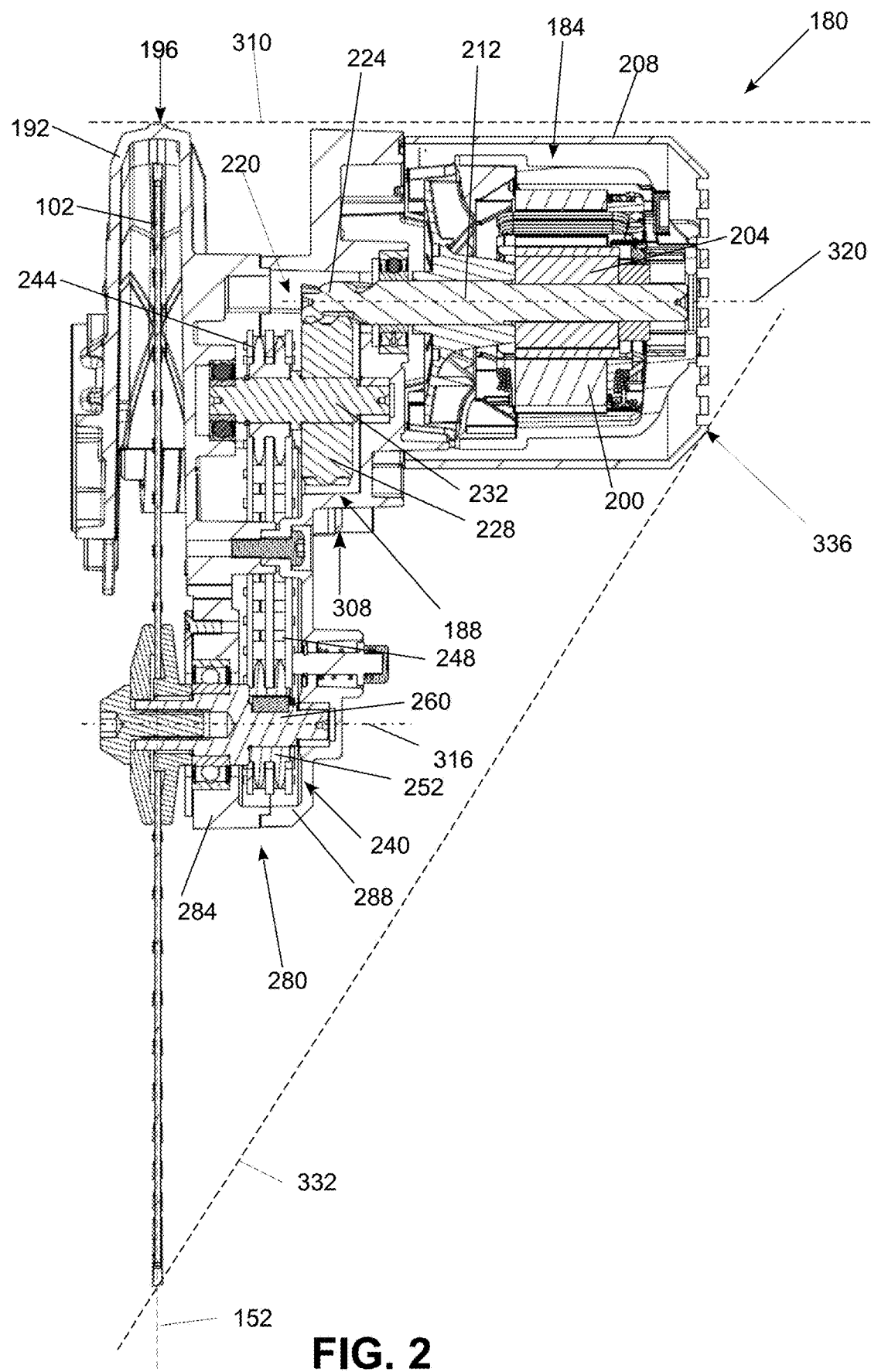
FIG. 2 is a front cross-sectional view of the miter saw device of FIG. 1 taken through a vertical plane that runs through the center of the arbor shaft, as shown in line A-A of FIG. 1.

The saw device 100 further includes a support assembly 140 that supports the cutting assembly 180. The support assembly 140 includes a bevel arm 144 rotatably supported on the turntable 104 about a bevel axis 148 that is approximately parallel to or coincident with the horizontal plane 112 and extends in a cutting plane 152 of the saw blade 102 (FIG. 2). Referring back to FIG. 1, the bevel arm 144 can be pivoted left or right about the bevel axis 148 so as to change the angle of the saw blade 102 relative to the support surface 116 to enable the saw device 100 to perform a bevel cut on the workpiece 80.

The support assembly 140 further includes a sliding arrangement 160 configured to enable movement of the cutting assembly 180 along the horizontal direction of the cutting plane 152. The sliding arrangement 160 may include, for example, a glide hinge assembly, a telescoping slide bar arrangement, or another desired assembly that allows the cutting assembly 180 to move forward and backward only.

The support assembly 140 supports a cutting assembly 180 of the saw device 100 at a pivot point 164 that pivotably connects the sliding assembly 160 to a cutting arm 182 of the cutting assembly 180. The support of the cutting arm 182 at the pivot point 164 allows the cutting assembly 180 to be pivoted along an arc centered at the pivot point 164 upwardly from the non-pivoted position depicted in FIG. 1 and downwardly from a pivoted position. In addition, a locking assembly (not shown) enables the cutting assembly 180 to be locked relative to the support assembly 140 to selectively prevent the pivoting movement of the cutting assembly 180. The cutting assembly 180 can therefore be positioned and locked in a range of vertical positions relative to the support surface 116 to enable the saw device 100 to perform a variety of cuts on workpieces.

The cutting arm 182 supports the remaining components of the cutting assembly 180, which includes a motor 184, a drivetrain 188, and an upper guard 192. As will be discussed in detail below, the motor 184 drives the saw blade 102 via the drivetrain 188, while the upper guard 192 shrouds the upper portion of the saw blade 102 to prevent inadvertent contact of the user or another object with the saw blade 102. The upper guard 192 is fixedly connected to the cutting arm 182 in the illustrated embodiment, though the reader should appreciate that other embodiments of the saw device may have a movable or pivotable upper guard.

The upper guard 192 has an uppermost extent 196 in the vertical plane 198 that bisects the saw blade 102. The uppermost extent 196 is spaced apart from the uppermost extent of the saw blade 102 by between approximately 2% and approximately 10% of the saw blade diameter. In one particular embodiment, the uppermost extent 196 is spaced apart from the uppermost extent of the saw blade 102 by between approximately 3% and approximately 5% of the saw blade diameter.

With particular reference now to FIG. 2, and continuing reference to FIG. 1, the motor 184 includes a stator 200 and a rotor 204, both of which are circumferentially enclosed in a motor housing 208. The stator 200 drives the rotor 204 to rotate when power is applied to the motor 184 in a manner generally known in the art. The rotor 204 is fixedly connected to a motor output shaft 212, which projects out of the motor housing 208, such that rotation of the rotor 204 rotates the motor output shaft 212.

In some embodiments, the stator 200 and rotor 204 have a low lateral profile or, in other words, have a relatively small width in the lateral direction, which is left-to-right in the view of FIG. 2. In one embodiment, the stator 200 and rotor 204 both have a width of less than approximately 2 inches. In another embodiment, the stator 200 and rotor 204 may have a width of less than approximately 1.5 inches.

The drivetrain 188 includes a gear train 220 and a chain drive 240, which transmit the rotation of the motor output shaft 212 to the arbor shaft 260, to which the saw blade 102 is fixedly attached, so as to rotate the saw blade 102. The gear train 220 includes a motor pinion gear 224, which is fixedly connected to the motor output shaft 212 so as to rotate with the motor output shaft 212, and an intermediate gear 228 that meshes with the motor pinion gear 224. In the illustrated embodiment, the motor pinion gear 224 is integrally and monolithically formed with the motor output shaft 212.

The intermediate gear 228 has a greater diameter than the motor pinion gear 224, and as a result, the intermediate gear 228 has a greater number of gear teeth than the motor pinion gear 224. The gear train 220 thus produces a step down in the motor speed such that the intermediate gear 228 rotates with lower speed and greater torque than the motor pinion gear 224. In some embodiments, the gear ratio of the gear train 220 may be, for example, between approximately 1:2 and approximately 1:6.

The intermediate gear 228 is rotationally fixed to an intermediate shaft 232 so as to rotate with the intermediate shaft 232. A driving sprocket 244 of the chain drive 240 is also rotationally fixed to the intermediate shaft 232, such that the driving sprocket 244 rotates at the same rotational speed as the intermediate gear 228. The chain drive 240 further includes an endless chain 248, which transmits the rotation of the driving sprocket 244 to a driven sprocket 252. The driven sprocket 252 is fixedly connected to the arbor shaft 260 so that the rotation of the driven sprocket 252 rotates the arbor shaft 260.

In the illustrated embodiment, the driving sprocket 244 and the driven sprocket 252 have the same diameter and the same number of teeth. As such, the chain drive 240 does not provide a speed reduction. In some embodiments, however, the driving sprocket 244 may be smaller than the driven sprocket 252 so as to enable the chain drive 240 to provide an additional step down of the motor speed and increase in the motor torque. In still further embodiments, the driving sprocket 244 may be larger than the driven sprocket 252 to provide an increase in motor speed and enable the driven sprocket to occupy less volume adjacent to the arbor shaft 260.

The gear train 220 and chain drive 240 are both housed in a drivetrain housing 280. The drivetrain housing 280 is formed of a left drivetrain housing part 284 and a right drivetrain housing part 288. In the illustrated embodiment, the left drivetrain housing part 284, the upper guard 192, and the cutting arm 182 are all integrally and monolithically formed as a single part, though the reader should appreciate that the parts may, in other embodiments, be formed separately from one another. While the right drivetrain housing part 288 is not depicted in FIGS. 1 and 3 to more clearly show the internal components of the drivetrain 188, the reader should appreciate that the outer profile of the right drivetrain housing part 288 is similar or identical to the outer profile of the left drivetrain housing part 284, except at the portion immediately adjacent to the motor housing 208 where the right drivetrain housing part 284 closes off an axial end of the motor housing 208.

The outer profile of the left and right drivetrain housing parts 284, 288, in the region below the motor housing 208, and more particularly below the lower surface 308 of the cutting arm 182, extend only by a small distance to the front and rear (i.e. to the left and right in the view of FIG. 1) outside the outer circumference of the endless chain 248. For example, in one particular embodiment, the outer profile of the left and right drivetrain housing parts 284, 288 extend by, at most, approximately 0.5 inches to the front and rear of the outer circumference of the endless chain 248. In another embodiment, the outer profile of the left and right drivetrain housing parts 284, 288 extend by, at most, approximately 0.25 inches to the front and rear of the outer circumference of the endless chain 248. The overall depth of the left and right drivetrain housing parts 284, 288 may be, for example, between approximately 15% and approximately 25% of the saw blade diameter. The left and right drivetrain housing parts may therefore extend from the vertical plane 198 defined by the central axis 316 of the arbor shaft 260 and the central axis 320 of the motor output shaft 212 by between approximately 7.5% and approximately 12.5% of the saw blade diameter.

As best seen in FIG. 1, the rear end surface 304 of the left drivetrain housing part 284, and therefore also the rear end surface (not shown) of the right drivetrain housing part 288 and the rear end surface (not shown) of the upper guard 192, both of which are aligned with the rear end surface 304 of the left drivetrain housing part 284 in the view of FIG. 1, defines the front end of a clearance space 340. The upper extent of the clearance space 340 is defined by the lower surface 308 of the cutting arm 182, while the bottom of the clearance space 240 is defined by the workpiece support surface 116. The clearance space 340 provides increased operating space for the workpiece 80 so as to enable the saw device 100 to cut workpieces with larger dimensions that conventional saw devices. The clearance space 340 extends rearwardly from the rear end surface 304 by a distance that may be, for example, approximately 25% to approximately 30% of the saw blade diameter. The clearance space 340 may therefore extend approximately 2 inches rearwardly for a 7.5 inch saw, approximately 2.5 inches rearwardly for an 8.5 inch saw, approximately 3 inches rearwardly for a 10 inch saw, and approximately 3.5 inches rearwardly for a 12 inch saw.

In addition, in the non-pivoted position of the cutting assembly 180 depicted in FIG. 1, the saw device 100 has vertical clearance within the clearance space 340 between the support surface 116 and the lower surface 308 that is approximately 65% of the saw blade diameter. Thus, vertical dimension of the clearance space 340 may be, for example, approximately 7.75 inches for a 12 inch saw, enabling the saw to cut nominal size 2×8 lumber, which has actual size of 1.5 inches by 7.25 inches. A 10 inch saw may have vertical clearance within the clearance space 340 of approximately 6.5 inches, while an 8.5 inch saw may have vertical clearance of approximately 5.5 inches.

In the illustrated embodiment, the entirety of the drivetrain 188, the entirety of the drivetrain housing 280, and the entirety of the motor housing 208 are located below a horizontal plane 310 (FIG. 2) that is defined by the uppermost extent 196 of the upper guard 192 as seen in the vertical plane 198 that bisects the saw blade 102 and arbor shaft 260 (i.e. the plane in which the view of FIG. 2 is taken) when the saw is in the non-pivoted position of FIG. 1. As a result, neither the drivetrain housing 280 nor the motor housing 208 extends above the horizontal plane 310 defined by the uppermost extent 196 of the upper guard 192 in the vertical plane 198. The saw device 100 is therefore vertically compact and, when the cutting assembly 180 is pivoted upwardly and rearwardly, the motor housing 208 does not interfere with any adjacent components, for example the vacuum hose 360 or the sliding arrangement 160. Consequently, the saw device can be moved easily and operated in smaller spaces and with less rear and upper clearance as compared to conventional saws.

Moreover, the drivetrain housing 280 is entirely contained within a region that is bounded by the cutting plane 152 and a plane 332 that connects the lower right extent 336 of the motor housing 208 with the bottom end of the saw blade 102 and that extends orthogonally to the vertical plane 198 that bisects the arbor shaft 260 and saw blade 102. The lower right extent 336 of the motor housing 208 is also positioned at a greater distance from the workpiece support surface 116 and closer to the cutting plane 152 than in conventional saws, thereby enabling the saw device 100 to perform right bevel cuts at a greater angle than conventional saws without interference between the motor housing 208 and the workpiece support surface 116.

In addition, in the embodiment of FIG. 1, the central axis 320 of the motor output shaft 212 is arranged, at least substantially, in the same vertical plane 198 that bisects the arbor shaft 260 when the saw is in the non-pivoted position of FIG. 1. As a result, the drivetrain 188, including both the gear train 220 and the chain drive 240, runs directly vertically (as seen in the non-pivoted position) from the motor output shaft 212 to the arbor shaft 260. The rear end surface 304 of the drivetrain housing 280 therefore also extends vertically, maximizing the amount of clearance space 340 behind the arbor shaft 260 and the drivetrain 188.

Figure 4:
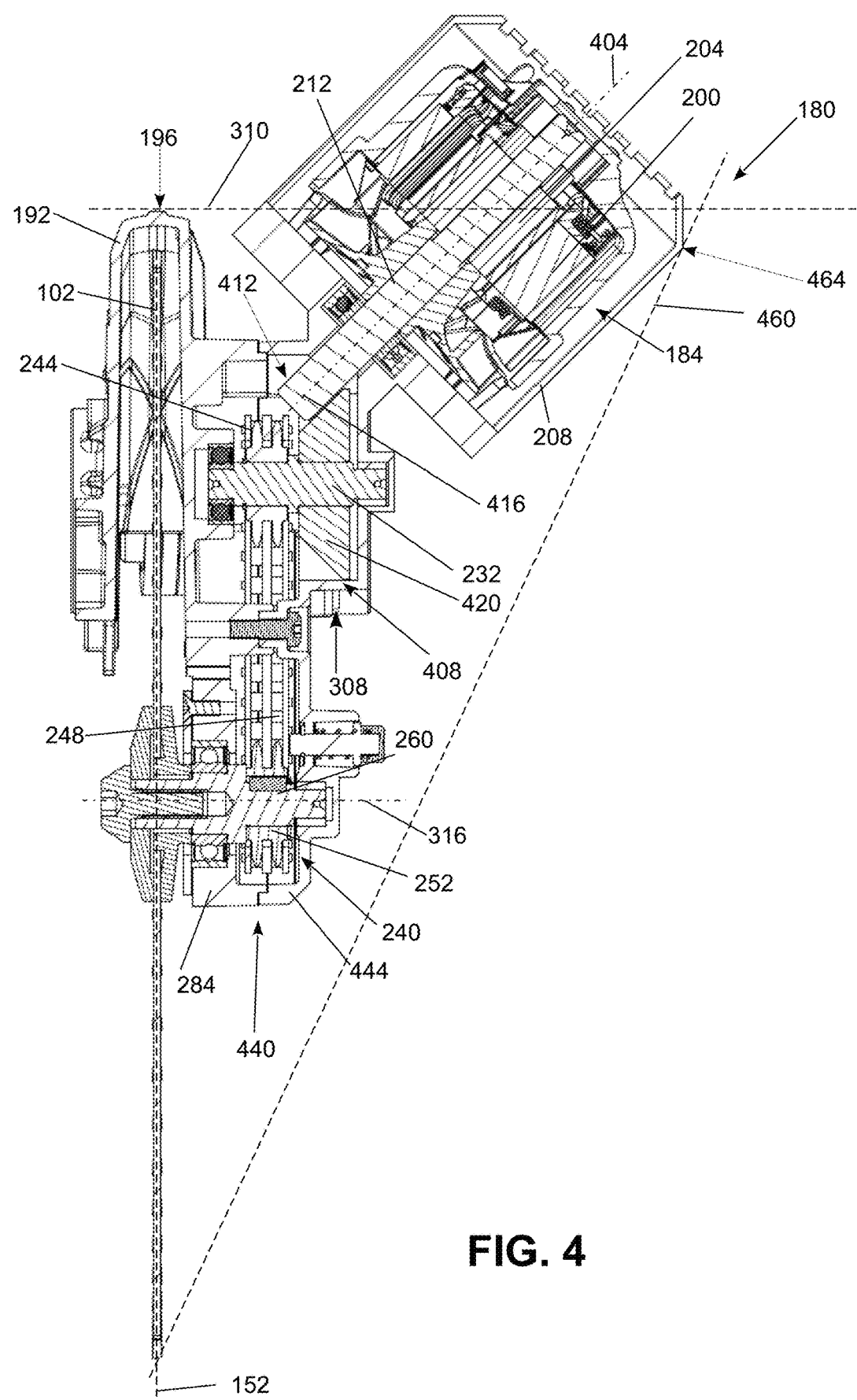
FIG. 4 is a front cross-sectional view of another drivetrain for a miter saw device, such as the powered saw of FIG. 1, taken through a vertical plane that runs through the center of the arbor shaft in which the motor is positioned at an angle relative to the horizontal plane.

FIG. 4 depicts a schematic view of another saw device 400 according to the disclosure. In the saw device 400 of FIG. 4, the motor 184 is arranged at an angle relative to the arbor shaft 260. More particularly, the motor 184 is configured such that the central axis 404 of the motor output shaft 212 is at an angle of 45 degrees relative to the central axis 316 of the arbor shaft 260. The reader should appreciate, however, that in other embodiments, the motor 184 may be arranged such that the motor output shaft 212 is at any desired angle relative to the arbor shaft 260, for example an angle of 30 degrees, 60 degrees, or any angle between zero and 90 degrees.

The drivetrain 408 in the embodiment of FIG. 4 includes a gear train 412 and a chain drive 240. The chain drive 240 is configured essentially the same as in the drivetrain 188 in the embodiment of FIGS. 1-3, and the chain drive of FIG. 4 is not therefore described in further detail.

Since the motor output shaft 212 and the intermediate shaft 232 are not parallel with one another in the saw device 400, the gear train 412 of the drivetrain 408 is configured as a bevel gear train. As such, the motor pinion gear 416 and the intermediate gear 420 are bevel gears configured to transmit the rotation of the motor output shaft 212 to the intermediate shaft 232, which has a central axis that is at least substantially parallel to the central axis 316 of the arbor shaft 260. In some embodiments, the gear train 412 may include, in addition to or as an alternative to one or both of the bevel gears, one or more face gears, miter gears, helical gears, and/or a hypoid gears.

Figure 3:
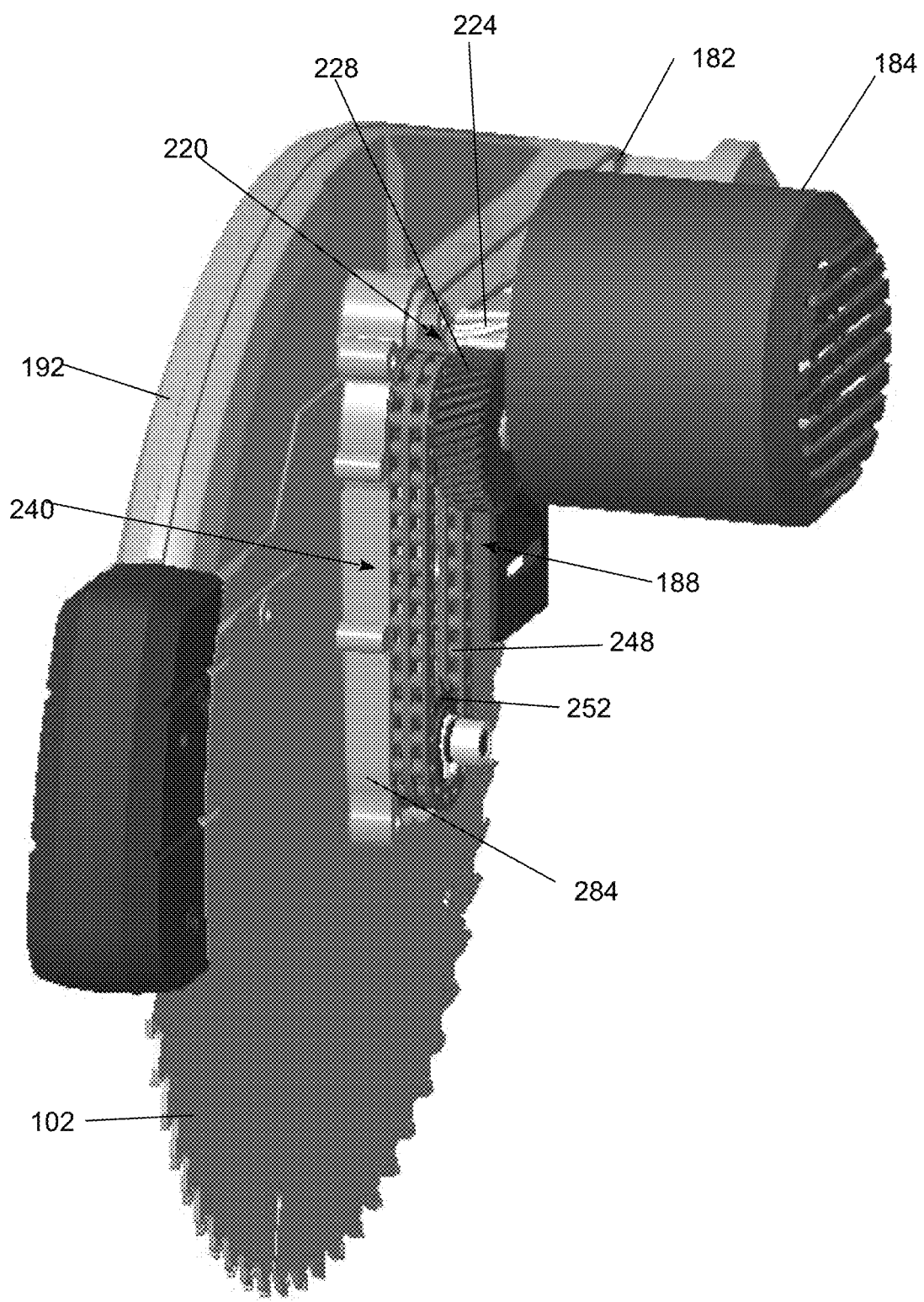
FIG. 3 is a front perspective view of the miter saw device of FIG. 1 with the drivetrain housing partially removed to more clearly show the chain and gear drivetrain.

In the embodiment of FIG. 4, similarly to the embodiment of FIGS. 1-3, the motor 184, in particular the central axis 404 of the motor output shaft 212, is arranged at least substantially in the same vertical plane as the central axis 316 of the arbor shaft 260 (e.g. the plane in which the cross-section is taken in the view of FIG. 4, which is analogous to the plane 198 shown in FIG. 1). The motor 184 and motor housing 208 are therefore centered across the vertical plane that bisects the arbor shaft 260.

The drivetrain housing 440 includes a left drivetrain housing part 284 integrally and monolithically formed with the upper guard 192, similarly to the left drivetrain housing part in the embodiment of FIGS. 1-3. The right drivetrain housing part 444 includes an upward projection that is angled toward the motor 184 at an angle of 45 degrees and configured to enclose the axial end of the motor 184 and receive the motor output shaft 212. The lower portion of the drivetrain housing 440 extends adjacent to the endless chain 248 in the same manner as described above with regard to the drivetrain housing 280 in the embodiment of FIGS. 1-3. Thus, the drivetrain housing 440 in the embodiment of FIG. 4, in combination with the upper guard and support arm, defines a clearance space that is the same as the clearance space 340 described above.

Moreover, the drivetrain housing 440 is entirely contained within a region that is bounded by the cutting plane 152 and a plane 460 that connects the lower right extent 464 of the motor housing 208 with the bottom end of the saw blade 102 and that extends orthogonally to the vertical plane in which the view of FIG. 4 is taken. The lower right extent 464 of the motor housing 208 is also positioned at a greater distance from the workpiece support surface 116 and closer to the cutting plane 152 than in conventional saws, thereby enabling the saw device 400 to perform right bevel cuts at a greater angle than conventional saws.

In particular, the lower right extent 464 of the motor housing 208 may be at a distance from the bottom end of the saw blade 102 that is between approximately 80% and approximately 100% of the saw blade diameter or, in other words, at approximately the same height as the upper extent of the upper guard 192. The lower right extent 464 may also be at a distance from the saw cutting plane 152 that is between approximately 40% and approximately 50% of the saw blade diameter. The configuration of the motor of the saw device 400 therefore enables the saw device 400 to perform right bevel cuts at angles greater than 60 degrees.

The drivetrain housing 440 is also almost entirely arranged below the horizontal plane 310 defined by uppermost point 196 of the upper guard 192. "Almost entirely arranged below" is defined to mean that no portion of the drivetrain housing 440 extends above the horizontal plane 310 by a distance of more than 5% of the saw blade diameter.

Figure 5:
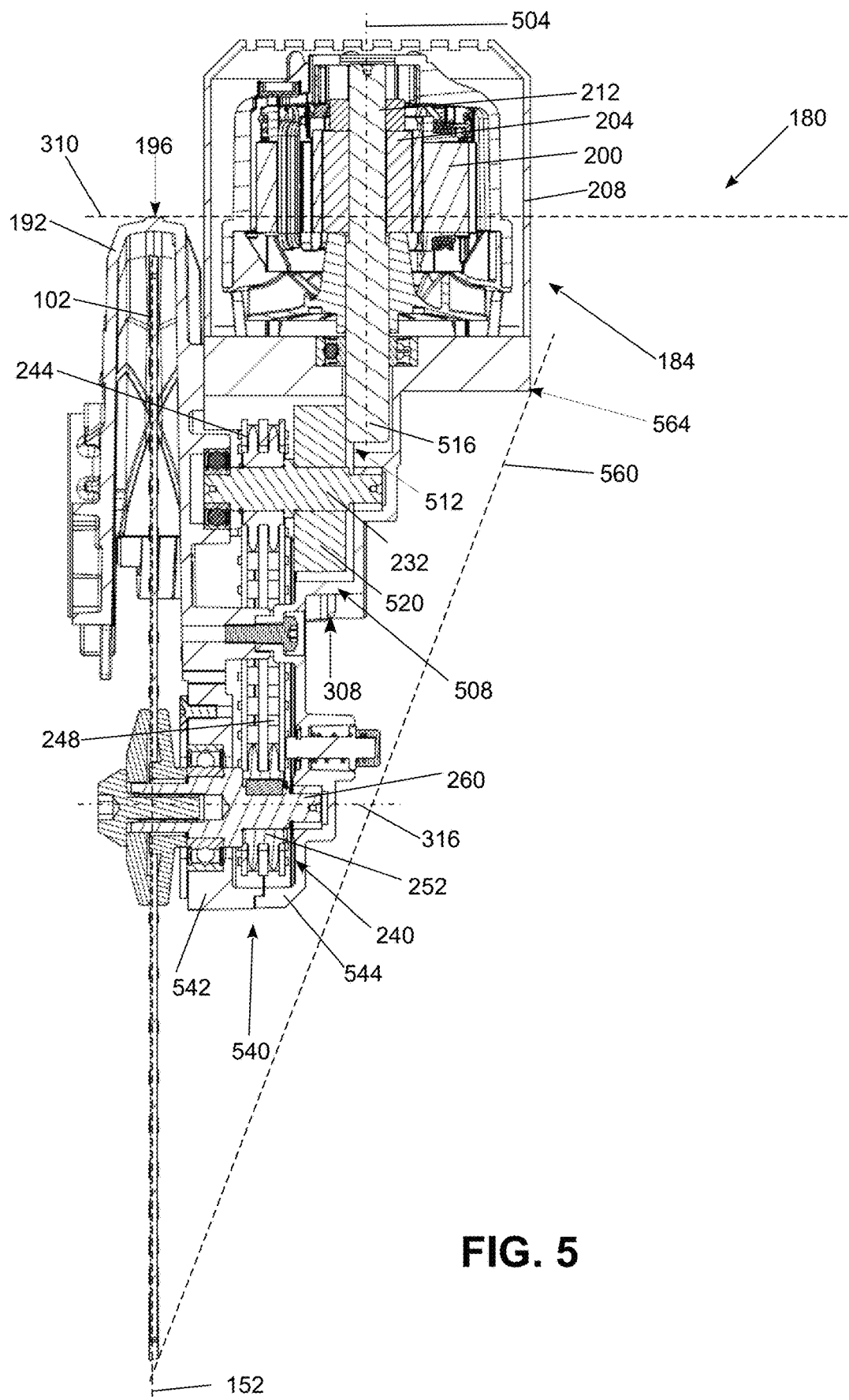
FIG. 5 is a front cross-sectional view of another drivetrain for a miter saw device, such as the powered saw of FIG. 1, taken through a vertical plane that runs through the center of the arbor shaft in which the motor is positioned such that the motor output shaft extends vertically.

FIG. 5 depicts a side schematic view of another saw device 500 in which the motor 184 is arranged vertically. As such, the central axis 504 of the motor output shaft 212 in the saw device 500 is vertical when the saw device 500 is in the non-pivoted position. In other words, the central axis 504 of the motor output shaft 212 is perpendicular to the central axis 316 of the arbor shaft 260.

The drivetrain 508 in the embodiment of FIG. 5 includes a gear train 512 and a chain drive 240. The chain drive 240 is configured essentially the same as in the drivetrain 188 in the embodiment of FIGS. 1-3, and the chain drive of FIG. 4 is not therefore described in further detail.

Since the motor output shaft 212 and the intermediate shaft 232 are perpendicular to one another, the gear train 512 of the drivetrain 508 may be configured as a bevel gear train or a face gear train. As such, the motor pinion gear 516 and the intermediate gear 520 are bevel gears or face gears configured to transmit the rotation of the motor output shaft 212 to the intermediate shaft 232, which has a central axis that is parallel to the central axis 316 of the arbor shaft 260. Alternatively, in some embodiments, the gear train 512 may be a hypoid gear train or a worm drive gear.

In the embodiment of FIG. 5, similarly to the embodiment of FIGS. 1-3, the motor 184, in particular the central axis 504 of the motor output shaft 212, is arranged at least substantially in the same vertical plane as the central axis 316 of the arbor shaft 260 (e.g. the plane in which the cross-section is taken in the view of FIG. 5, which is analogous to the plane 198 shown in FIG. 1). The motor 184 and motor housing 208 are therefore centered across the vertical plane that bisects the arbor shaft 260.

The drivetrain housing 540 includes a left drivetrain housing part 542 integrally and monolithically formed with the upper guard 192. The left drivetrain housing part 542 is configured similarly to the left drivetrain housing part in the embodiment of FIGS. 1-3, with the exception that the upper portion of the left drivetrain housing part 542 is truncated so as to provide space for the motor housing 208 adjacent to the upper guard 192.

The right drivetrain housing part 544 includes an upper projection that is directly adjacent to the upper guard 192 and encloses the axial end of the motor 184 and motor output shaft 212. The lower portion of the drivetrain housing 540 extends adjacent to the endless chain 248 in the same manner as described above with regard to the drivetrain housing 280 in the embodiment of FIGS. 1-3. Thus, the drivetrain housing 540 in the embodiment of FIG. 5, in combination with the upper guard and support arm, defines a clearance space that is the same as the clearance space 340 described above.

Moreover, the drivetrain housing 540 is entirely contained within a region that is bounded by the cutting plane and a plane 560 that connects the lower right extent 564 of the motor housing 208 with the bottom end of the saw blade 102 and that extends orthogonally to the vertical plane in which the view of FIG. 5 is taken. The lower right extent 564 of the motor housing 208 is also positioned at a greater distance from the table support surface and closer to the cutting plane 152 than in conventional saws, thereby enabling the saw device 500 to perform right bevel cuts at a greater angle than conventional saws.

In particular, the lower right extent 564 of the motor housing 208 may be at a distance from the bottom end of the saw blade 102 that is between approximately 55% and approximately 75% of the saw blade diameter. The lower right extent 564 may also be at a distance from the saw cutting plane 152 that is between approximately 25% and approximately 40% of the saw blade diameter. The configuration of the motor of the saw device 500 therefore enables the saw device 500 to perform right bevel cuts at angles greater than 60 degrees.

Similarly to the embodiment of FIGS. 1-3, the drivetrain 508 and the drivetrain housing 540 is also arranged entirely below the horizontal plane 310 defined by uppermost point 196 of the upper guard 192.

It will be appreciated that variants of the above-described and other features and functions, or alternatives thereof, may be desirably combined into many other different systems, applications or methods. Various presently unforeseen or unanticipated alternatives, modifications, variations or improvements may be subsequently made by those skilled in the art that are also intended to be encompassed by the foregoing disclosure.

The invention claimed is:

1. A saw device comprising:
 a motor having a motor output shaft;
 a drivetrain comprising:
  a gear train having a first gear fixedly connected to the motor output shaft and a second gear fixedly connected to an intermediate shaft, the first gear meshing with the second gear so as to transmit rotation from the motor output shaft to the second gear; and
  a chain drive having a driving sprocket fixedly connected to the intermediate shaft, a driven sprocket, and a chain configured to transmit rotation of the driving sprocket to rotation of the driven sprocket;
 an arbor shaft fixedly connected to the driven sprocket, the arbor shaft configured to mount a saw blade such that the saw blade rotates with the arbor shaft;
 an upper guard configured to enclose at least a portion of the saw blade; and
 a motor housing in which the motor is housed,
 wherein the saw device possesses a saw blade diameter, and the saw blade diameter defines a saw blade extent centered at a central axis of the arbor shaft,
 wherein the drivetrain is located entirely below a horizontal plane defined by an uppermost point of the upper guard in a vertical plane that bisects the arbor shaft, the uppermost point being spaced apart from the saw blade extent by a distance of between 1.8% and 11% of the saw blade diameter, and
 wherein the motor housing is located entirely below the horizontal plane.

2. The saw device of claim 1, wherein the motor output shaft and the intermediate shaft are arranged in the vertical plane that bisects the arbor shaft along the central axis of the arbor shaft.

3. The saw device of claim 2, wherein the motor output shaft extends at an angle of greater than or equal to zero degrees and less than or equal to 90 degrees relative to the intermediate shaft and the arbor shaft.

4. The saw device of claim 2, further comprising:
a drivetrain housing in which the drivetrain is enclosed, the drivetrain housing being almost entirely arranged below the horizontal plane.

5. The saw device of claim 4, wherein the drivetrain housing has a lower portion with a rear end surface that extends vertically adjacent to the chain.

6. The saw device of claim 2, wherein the drivetrain is located entirely within a volume bounded by a horizontal extension of the saw blade extent.

7. The saw device of claim 1, wherein the gear train has a gear reduction of between 1:2 and 1:6.

8. A miter saw comprising:
a turntable defining a workpiece support surface;
a motor having a motor output shaft;
a drivetrain comprising:
  a gear train having a first gear fixedly connected to the motor output shaft and a second gear fixedly connected to an intermediate shaft, the first gear meshing with the second gear so as to transmit rotation from the motor output shaft to the second gear; and
  a chain drive having a driving sprocket fixedly connected to the intermediate shaft, a driven sprocket, and a chain configured to transmit rotation of the driving sprocket to rotation of the driven sprocket;
an arbor shaft fixedly connected to the driven sprocket, the arbor shaft configured to mount a saw blade such that the saw blade rotates with the arbor shaft;
an upper guard configured to enclose at least a portion of the saw blade; and
a motor housing in which the motor is housed,
wherein the miter saw possesses a saw blade diameter, and the saw blade diameter defines a saw blade extent centered at a central axis of the arbor shaft,
wherein the drivetrain is located entirely below a horizontal plane that is parallel to the workpiece support surface and is defined by an uppermost point of the upper guard in a vertical plane that bisects the arbor shaft, the uppermost point being spaced apart from an uppermost extent of the saw blade extent by between 1.8% and 11% of the saw blade diameter, and
wherein the motor housing is located entirely below the horizontal plane.

9. The miter saw of claim 8, wherein the motor output shaft and the intermediate shaft are arranged in the vertical plane that bisects the arbor shaft along the central axis of the arbor shaft.

10. The miter saw of claim 9, wherein the motor output shaft extends at an angle of greater than or equal to zero degrees and less than or equal to 90 degrees relative to the intermediate shaft and the arbor shaft.

11. The miter saw of claim 9, further comprising:
a drivetrain housing in which the drivetrain is enclosed, the drivetrain housing being almost entirely arranged below the horizontal plane.

12. The miter saw of claim 11, wherein the drivetrain housing has a lower portion with a rear end surface that extends vertically adjacent to the chain.

13. The miter saw of claim 9, wherein the drivetrain is located entirely within a volume bounded by a horizontal extension of the saw blade extent.

* * * * *